United States Patent [19]

Nakajima et al.

[11] Patent Number: 5,143,752

[45] Date of Patent: Sep. 1, 1992

[54] FILTERING MATERIAL OF APATITE AND GLUCAN USED FOR SURGICAL MASKS AND METHOD OF MAKING IT

[75] Inventors: Tooru Nakajima; Sumiaki Tsuru, both of Tokyo, Japan

[73] Assignee: Bestex Kabushiki-Kaisha, Tokyo, Japan

[21] Appl. No.: 828,359

[22] Filed: Jan. 30, 1992

[51] Int. Cl.$^5$ ............................................. A62B 18/02
[52] U.S. Cl. ...................................... 427/244; 55/524; 55/527; 128/206.19; 210/502.1; 427/427; 427/430.1; 428/283
[58] Field of Search ................. 55/522, 524, 527, 528, 55/DIG. 35; 2/9; 128/206.19; 210/500.1, 500.29, 502.1, 504, 506, 508; 427/209, 244, 245, 421, 427, 430.1; 428/283, 288, 319.1, 311.1, 311.7; 423/308, 311

[56] References Cited

U.S. PATENT DOCUMENTS

| 3,929,971 | 12/1975 | Roy | 423/308 |
| 4,503,157 | 3/1985 | Hatahira | 423/308 |
| 4,856,509 | 8/1989 | Lemelson | 128/206.19 |

FOREIGN PATENT DOCUMENTS

| 3712875 | 11/1988 | Fed. Rep. of Germany | 55/524 |
| 59-145087 | 8/1984 | Japan | 210/502.1 |
| 63-44997 | 2/1988 | Japan | 210/502 |

*Primary Examiner*—Robert A. Dawson
*Assistant Examiner*—Joseph Drodge
*Attorney, Agent, or Firm*—Wenderoth, Lind & Ponack

[57] ABSTRACT

A filtering material for effectively adsorbing not only conventional foreign material such as dust, odoring gaseous substance but also very fine foreign material such as virus, bacteria, fungus, pollen or the like is disclosed. The filtering material includes as essential components porous apatite particles, a water soluble glucan and a sheet-shaped raw material in which the porous apatite particles are included with the aid of the water soluble glucan serving as a binder. A method of producing a filtering material of the foregoing kind is practiced by way of a step of preparing an aqueous treatment solution in which porous apatite particles of 0.5 to 40% by weight and a water soluble glucan of 0.5 to 15% by weight are dispersively dissolved, a step of immersing a sheet-shaped raw material in the aqueous treatment solution, and a step of drying the sheet-shaped raw material while the porous apatite particles are included in the sheet-shaped raw material with the aid of the water soluble glucan serving as a binder. Alternatively, a step of spraying the aqueous treatment solution to surfaces of a sheet-shaped raw material may be substituted for the step of immersing a sheet-shaped raw material in the aqueous treatment solution. It is preferable from the viewpoint of practice use that the porous apatite particles make up between 0.5 and 30% of the treatment solution.

5 Claims, No Drawings

FILTERING MATERIAL OF APATITE AND GLUCAN USED FOR SURGICAL MASKS AND METHOD OF MAKING IT

BACKGROUND OF THE INVENTION

1. Field of the Invention

The present invention relates to a filtering material for effectively and reliably adsorbing not only conventional foreign material such as dust, unpleasantly odoring gaseous substance or the like but also very fine infectious or antigenous foreign material such as virus, bacteria, fungus, pollen or the like. Further, the present invention relates to a method of producing a filtering material of the foregoing kind.

2. Description of the Related Art

As is well known for any expert in the art, a conventional filtering material employable for a mask or the like is generally constructed such that only fibers are directionally or undirectionally arranged to form a mesh-shaped laminated structure having a predetermined thickness. To improve gas adsorption properties of the filtering material, another conventional filtering material is constructed to form a different laminated structure, i.e., a sandwiched structure having a predetermined thickness such that a gas adsorbing agent such as an activated carbon or the like is interposed between two filtering materials each composed of fibers.

With respect to each of the conventional filtering materials as mentioned above, it has been confirmed from the results derived from a series of incubation tests that it can substantially reliably adsorb dust or unpleasantly odoring substance but it can hardly adsorb very fine infectious or antigenous foreign material such as virus, bacteria, fungus, pollen or the like.

For this reason, any one of the conventional filtering materials has a drawback that it can not suitably be employed for masks available for surgical operations, since virus, bacteria and fungus contained in a breath blown from a surgeon are undesirably scattered to a patient because of failure to adsorb them in the filtering material of a mask or virus, bacteria and fungus contained in a mist-shaped body fluid or blood scattered from the patient can not be removed by the mask born by the surgeon.

In addition, since each conventional filtering material can not substantially adsorb pollen scattered from cedars, other drawback of the conventional filtering material is that it can not practically be utilized as a filtering material for masks available for a pollinosis which has become a serious problem in this country in recent years.

When the conventional filtering materials are considered from the viewpoint of a production method, there arises a drawback that an inexpensive paper can not be used as a sheet-shaped raw material for the following reasons. One of them consists in that when a paper having poor toughness is immersed in a treatment solution bath, there is a possibility that the paper is broken or torn due to reduction of a strength of the paper itself after completion of the immersing operation. The other one consists in that when a paper having excellent toughness is used as a sheet-shaped raw material, it is difficult that porous apatite particles, one of components constituting the filtering material penetrates into fibers of the paper or the porous apatite particles adhesively deposited on the paper are liable to peel away from surfaces of the paper.

Alternatively, when a fibrous material is employed as a sheet-shaped raw material, there arises another drawback that porous apatite particles are locally gathered in a certain region until they are filled in the sheet-shaped raw material or sprayed on surfaces of the same and the sheet-shaped material filled or sprayed with the porous apatite particles is then thermally dried.

SUMMARY OF THE INVENTION

The present invention has been made with the foregoing background in mind.

An object of the present invention is to provide a filtering material which assures that not only conventional foreign material such as dust, unpleasantly odoring gaseous substance or the like but also very fine infectious or antigenous foreign material such as virus, bacteria, fungus, pollen or the like can adsorptively be removed by using the filtering material.

Other object of the present invention is to provide a method of producing a filtering material which assures that an inexpensive paper can be used as a sheet-shaped raw material.

Another object of the present invention is to provide a method of producing a filtering material of the foregoing kind wherein the method assure that the filtering material can be produced at a high operational efficiency on the industrial basis.

According to one aspect of the present invention, there is provided a filtering material which comprises porous apatite particles, a water soluble glucan, and a sheet-shaped raw material in which the porous apatite particles are included with the aid of the water soluble glucan serving as a binder.

In addition, according to other aspect of the present invention, there is provided a method of producing a filtering material wherein the method comprises a step of preparing an aqueous treatment solution in which porous apatite particles of 0.5 to 40% by weight and a water soluble glucan of 0.5 to 0.15% by weight are dispersively dissolved, a step of immersing a sheet-shaped raw material in the aqueous treatment solution, and a step of drying the sheet-shaped raw material while the porous apatite particles are included in the sheet-shaped raw material with the aid of the water soluble glucan serving as a binder.

It is preferable from the viewpoint of practical use that the porous apatite granules are contained in the aqueous treatment solution depending on an application field of the filtering material by a quantity of 0.5 to 30% by weight.

Additionally, according to another aspect of the present invention, there is provided a method of producing a filtering material wherein the method comprises a step of preparing an aqueous treatment solution in which porous apatite particles of 0.5 to 40% by weight and a water soluble glucan of 0.5 to 15% by weight are dispersively dissolved, a step of spraying the aqueous treatment solution to surfaces of a sheet-shaped raw material, and a step of drying the sheet-shaped raw material while the porous apatite particles are adhesively deposited on the surfaces of the sheet-shaped raw material.

Similarly, it is preferable from the viewpoint of practical use that the porous apatite particles are included in the aqueous treatment solution depending on an application field of the filtering material by a quantity of 0.5 to 30% by weight.

The porous apatite particles are an essential component for carrying out the present invention. The surface of each porous apatite particle is highly activated to adsorb very fine foreign material such as virus, bacteria, fungus, pollen or the like by the action of ionic bond or hydrogen bond or by the action of multiple bond plus conformation derived from a Van der Waals force or mutual function appearing between bipole moments.

In addition, virus, bacterial, fungus, pollen or the like can reliably be adsorbed in an ample quantity of hydroxyls present in molecules of the glucan by the action of hydrogen bond of the hydroxyls to saccharide chains and mucopolysaccharides on the surface of virus, bacteria, fungus, pollen or the like.

With the filtering material of the present invention, hydrogen bond successively occurs between the hydroxyls present in molecules of the glucan and virus, bacteria, fungus, pollen or the like until multiple bond is accomplished therebetween, resulting in the bonding network being extensively enlarged in the form of a spider's net. In other words, very fine particles such as virus, bacterial, fungus, pollen or the like can easily be captured on threads of the spider's net.

In such manner, according to the present invention, a capability of the filtering material for adsorbing infectious or antigenous very fine particles can remarkably be improved not only by the action derived from physical and chemical structures and properties of the porous apatite particles and the glucan but also by the multiplied action appearing between the porous apatite particles and the glucan.

DESCRIPTION OF THE PREFERRED EMBODIMENTS

Now, the present invention will be described in detail hereinafter with reference to preferred embodiments and a few examples.

To carry out the present invention, a filtering material comprising porous apatite particles, a water soluble glucan, and a sheet shaped raw material in which the porous apatite particles are contained with the aid of the glucan serving as a binder is inevitably essential. According to an embodiment of the present invention, the porous apatite particles of 0.5 to 40% by weight and the water soluble glucan 0.5 to 15% by weight are dispersively dissolved in water to prepare an aqueous treatment solution in which a sheet-shaped raw material in turn is immersed or which in turn is sprayed on surfaces of the sheet-shaped raw material. Alternatively, in view of possible breakage of a final product of filter during its practical use, a quantity of the porous apatite particles may be defined depending on an application field of the filter to remain within the range of 0.5 to 30% by weight based on the aqueous treatment solution.

Either a paper or a fibrous sheet or a cloth is used as a sheet-shaped raw material in which the porous apatite particles are filled or on which they are adhesively deposited. The sheet-shaped raw material filled or sprayed with the porous apatite particles is dried so that they are thermally set on the sheet-shaped raw material with the aid of the glucan serving as a binder.

Usually, the sheet-shaped raw material may be immersed in a bath containing the aqueous treatment solution. Alternatively, the aqueous treatment solution may be sprayed on surfaces of the sheet-shaped raw material by blowing a breath from an operator's mouth or actuating a spray gun.

Next, description will be made below with respect to a method of producing a filtering material of the aforementioned kind in accordance with other embodiment of the present invention.

Specifically, porous apatite particles of 0.5 to 40% by weight and a water soluble glucan of 0.5 to 15% by weight are first dispersively dissolved in water to prepare an aqueous treatment solution. It should be noted that a content of each component as mentioned above is defined based on the aqueous treatment solution on the assumption that a content of the aqueous treatment solution is represented by 100% by weight.

As a second step of the method, a sheet-shaped raw material made of fibers (hereinafter referred to simply as a sheet) is dipped in a bath containing the aqueous treatment solution. After it is confirmed that the sheet is sufficiently coated with the aqueous treatment solution in a wetted state, it is taken up from the bath so that it is dried so as to allow the porous apatite particles to be thermally set on the sheet-shaped raw material.

The reason why a content of the porous apatite particles is defined to remain within the aforementioned range consists in that when it exceeds 40% by weight, an air permeability of the resultant product of filtering material is degraded, whereas when the content of the same is lower than 0.5% by weight, a capability of the filtering material for adsorbing very fine infectious or antigenous particles such as virus, bacteria, fungus, pollen or the like is undesirably reduced, resulting in practicability of the filtering material being lost.

In a case where the filtering material containing the porous apatite particles of 40% or more by weight is used in a bent state for some reason, there is a possibility that the filtering material is broken due to brittleness of the filtering material. For this reason, it is preferable that the content of porous apatite particles is defined in consideration of an application field of the filtering material to remain within the range of 0.5 to 30% by weight.

Similarly, the reason why a content of the water soluble glucan is defined in the above-described manner consists in that when it exceeds 15% by weight, air permeability of the filtering material is degraded, whereas when the content of the same is lower than 0.5% by weight, a capability of the filtering material for adsorbing very fine infectious or antigenous particles such as virus, bacteria, fungus, pollen or the like is undesirably reduced, resulting in practicability of the filtering materiel being excessively deteriorated.

Usually, the sheet is prepared in the form of a woven cloth or an unwoven cloth made of natural fibers such as cotton fibers or the like, synthetic fibers or composite fibers including natural fibers and synthetic fibers in a mixed state.

The porous apatite serving as a most essential component for the filtering material of the present invention will be described in more detail below.

In practice, it is most acceptable that a porous hydroxyl calcium apatite (hereinafter referred to simply as HAP), a porous fluorided apatite (hereinafter referred to simply as FAP) and a mixture of HAP and FAP each having a pore diameter equal to or larger than a size of very fine particle to be adsorbed therein are processed to prepare porous apatite particles. To produce the porous apatite particles, it is recommendable that a gas generating substance such as polyvinyl alcohol or the like is mixed with them before a sintering operation is performed for the porous apatite particles.

HAP particles, FAP particles and a mixture of them each of which is an inorganic particle and each of which surface is highly activated are able to adsorptively capture very fine infectious or antigenous particles such as virus, bacteria or similar nuclearic acid molecules.

On the other hand, with respect to the water soluble glucan, it is recommendable to use, e.g., a triose having a molecular weight of 30,000 to 300,000. The triose acts to adsorptively capture flying very fine infectious or antigenous particles such as virus, bacteria, fungus, pollen or the like. In addition, the triose includes molecules each having an ample quantity of hydroxyls for bonding porous apatite particles to surfaces of each fiber. Thus, the triose can adsorptively captures very fine particles such as virus, bacteria, fungus, pollen or the like each of which surface is covered with saccharide chains or mucopolysaccharides, by the action of hydrogen bond or similar function.

To improve connectability of fibers to two components, i.e., the porous apatite and the glucan, e.g., a polyvinyl alcohol having a small number of molecules may be added to the filtering material of the present invention as a third component. Additionally, to improve a property of the filtering material in respect of resistibility against bacillus, a metal such as zinc, copper, silver or the like each having an excellent property of resistibility against bacillus may be inserted into adjacent crystal lattices of the HAP as a fourth component while the metal is substituted for calcium in the HAP.

A mask can be noted as a typical example of practical use of the filtering material prepared in the above-described manner, and it has been found from the results derived from practical use of the mask that the filtering material of the present invention can reliably adsorptively capture very fine infectious or antigenous particles such as virus, bacteria, fungus, pollen or the like no matter how quickly a gas such as a breath blown from the mouth of a surgeon or a patient flows through the filtering material of the mask.

EXAMPLE 1

An unwoven cloth (having a thickness of 1 mm) made of a mixture of polyester fibers and cellulose fibers was immersed in a bath containing an aqueous treatment solution which was prepared by dispersively dissolving HAP particles of 0.5 to 30% by weight and triose-based glucan of 0.5 to 15% by weight having a molecular weight of about 100,000 in water. After it was confirmed that the HAP and the glucan were sufficiently secured to the surface of each fiber, the cloth was taken up from the bath. Subsequently, the porous apatite particles on the cloth were thermally set at a temperature of about 150° C. After completion of the thermal setting operation, the cloth was cut into a plurality of pieces each having dimensions of 10 cm×5 cm so that each piece was used as a filtering element for a mask.

The HAP particle had a porous structure on the suaface thereof, a medium diameter 50 micron of particle size distribution, and about 10 $^2$/g of specific surface area which were given by sintering. In addition, it was found that a number of pores of the HAP particle were distributed within the range having a pore diameter of 50 microns as a center. In addition, it was found from the results derived from measurements that the filtering material had a surface area of about 10 m$^2$ per one gram.

A concrete example of production of the filtering material was such that HAP particles of about 3% by weight and triose based glucan of about 3% by weight were dispersively dissolved in water to prepare an aqueous treatment solution.

When the HAP particles were bound to the cloth by the action of weak hydrogen bond or electrostatic bond, there was a tendency that the bound state therebetween was increasingly weakened and finally lost as the mask was repeatedly used while it was bent. In view of the foregoing malfunction, the thermal setting operation was performed to physically reinforce the aforementioned bound state by pressing the network structure of fibers in the cloth at an elevated temperature. Once the thermal setting operation was completed, no bound water was escaped from the filtering material but only free water was escaped from the same, resulting in the adsorbing capability of the mask being improved.

With the mask produced in the above-described manner by using the cut piece of cloth having dimensions of 10 cm×5 cm, a series of tests for checking a performance of the mask of inhibiting bacilli subtilis from permeating through the cut cloth piece of the mask at a flow rate corresponding to a standard flow rate of 40 dm$^3$/minute at the time of a single man's breath were conducted by using a contamination mist model having about four bacilli subtilis per one cm$^3$ distributed over the surface of the model. The results derived from the tests conducted in a space having a relative moisture of 70% and a cleaning degree class of 100 revealed that a largest total number of bacilli subtilis which had permeated through the cut cloth piece of the mask within a period of one hour was one or no bacillus subtilis permeated therethrough within the same period of time. This means that the mask corresponding to a cleaned space having a cleaning degree class of 1000 or less as roughly calculated was provided, and an amazingly high masking effect was obtained with the mask for which the filtering material of the present invention was employed.

Generally speaking, several ten bacterias each having a grain size of 0.2 to 30 microns are present in a living space having a cleaning degree class of 10000. Thus, it can be considered that the filtering material of the present invention assures that no bacteria can permeate through the cut cloth piece of the mask under practical operational conditions. If it is required that the capability for inhibiting bacilli from permeating therethrough is improved further, it is recommendable that two cut cloth pieces each having the filtering material of the present invention used therefor are laminated together.

Next, description will be made below with respect to a method of producing a filtering material of the aforementioned kind in accordance with another embodiment of the present invention.

In this embodiment, the method is practiced by way of three steps in the substantially same manner as the preceding embodiment with the exception that a second step of spraying an aqueous treatment solution to surfaces of a sheet is substituted for the second step of the preceding embodiment of dipping a sheet in an aqueous treatment solution.

Specifically, a first step of preparing an aqueous treatment solution is performed in the same manner as that in the preceding embodiment of the present invention. Thus, repeated description will not be required.

As a second step of the method, the thus prepared aqueous treatment solution is sprayed to surfaces of each sheet by blowing it with the aid of an atomizer operable win an operator's mouth in accordance with an atomizing principle on the experimental basis or handling a spray gun on the industrial basis.

As a material employable for the sheet, a thin pulp paper or Japanese traditional paper having excellent air permeability can be used in addition to the woven cloth or the unwoven cloth as mentioned above.

When the aqueous treatment solution is sprayed over the whole surface area of the sheet with the aid of an atomizer on the experimental basis, it is acceptable that a short distance of about 30 cm is maintained between the sheet and the atomizer because the atomizer can not give a sufficiently high flying speed to the porous apatite particles when a long distance is maintained therebetween.

On the other hand, when the spray gun is used for performing a spraying operation, it is recommendable that it is actuated using pressurized air having a pressure of, e.g., several $kg/cm^2$ while a distance of about one meter is maintained between the sheet and the spray gun during the spraying operation. In a case where the filtering material of the present invention is produced on the mass production basis, it is preferable that a roll-shaped sheet is installed on a roll stand so that an unrolled sheet is continuously displaced in the horizontal direction in front of the spray gun.

A quantity of aqueous treatment solution to be sprayed to a surface of each sheet is determined such that the whole surface of the sheet is sufficiently and uniformly coated with the aqueous treatment solution in a wetted state. After completion of the spraying operation, when it is found that the sheet has some parts which are not coated with the aqueous treatment solution, the resultant product of filtering material is unacceptable because of the presence of hole-shaped flaws. On the other hand, when the sheet is excessively coated with the aqueous treatment solution, an extra part of the sprayed aqueous treatment solution falls down from the sheet by its own dead weight, resulting in a part of the aqueous treatment solution being uselessly consumed.

If the sheet has a heavy thickness, it is recommendable that a spraying operation is performed from opposite sides of the sheet. On the contrary, if the sheet is a paper having poor toughness, it is preferable that a spraying operation is performed only from the front side while the paper is backed up by a suitable backup plate. It should be added that after completion of the spraying operation, the coated paper can easily be peeled away from the backup plate without any trouble.

A third step of the method is performed in the substantially same manner as the preceding embodiment of the present invention. Thus, repeated description will not be required.

To practice the method of the present invention, the sheet having the filtering material deposited thereon may be displaced between, e.g., an opposing pair of hot rolls each heated up an elevated temperature of about 150° C. so as to allow the filtering material to be subjected to hot pressing and then thermally set. This is attributable to the fact that with the exception of porous apatite particles involved in fibers constituting the sheet, bonding of porous apatite partciles to fibers by the action of weak hydrogen bond, electrostatic bond or the like is liable to undesirably disappear as the sheet is repeatedly bent. The thermal setting operation is intended to effectively reinforce the foregoing bonding therebetween by tightening the network structure of fibers under the effect of the hot pressing. Once the sheet has been thermally set, there is no possibility that bond water escapes from the sheet but only free water is vaporized from the sheet, resulting in an adsorptive capability of the mask being improved. In addition, when the sheet is subjected to hot pressing, the porous apatite particles forcibly penetrates into the fibers of the sheet, resutling in the adsorptive capability of the mask being improved further.

With respect to the filtering material of the present invention produced in the above-described manner, a series of tests were conducted to examine a capability of adsorbing various kinds of virus, and some of the results derived from the tests will be described below.

EXAMPLE 2

A few samples were prepared from the filtering material of the present invention for conducting the following tests. Specifically, a suspension including influenza virus (A/PR/8) was caused to pass through a sample of the filtering material. Thereafter, a virus titer of the suspension which had passed through the filtering material was detected after a hemagglutination test reaction and a neutralization test were completed using a chicken as a test animal.

The results derived from the tests are shown in Table 1. It should be noted that a "blank" part on the column of sample of the table represents a case where the influenza virus in the suspension could not permeate through the filtering material. Here, the hemagglutination test refers to a test of allowing the chicken's red cells to be coagulated together in the presence of influenza virus, and the presence or absence of the influenza virus can be detected based on the result representing the presence or absence of the influenza virus after completion of the hemagglutination test. The result representing a virus titer of 256 shows that coagulation took place even when the suspension which had passed through the filtering material was diluted with saline by a quantity of 256 times.

In addition, the neutralization test refers to a test of allowing the influenza virus to destroy lung cells of human's embryo when it adheres to them, and a numeral of $10^4$ representing the virus titer shows the number of destroyed cells.

TABLE 1

| sample | virus titer | |
|---|---|---|
| | hemgglutination test | neutralization test (PFU) |
| blank | 256 | $10^4$ |
| unwoven cloth | 256 | $10^4$ |
| filtering material of the present invention | 32 | less than 10 |

EXAMPLE 3

An example representing a capability for adsorbing bacteria in the filtering material produced by employing the method of the present invention is shown in Table 2.

Specifically, Table 2 shows, by way of the number of bacteria remaining in each suspension after completion of flowing through the filtering material of the present invention, the capability for adsorbing bacteria in the filtering material when suspensions including bacteria, i.e., Escherichia coli, Staphylococcus aureus and Pseudomonas aeruginosa were caused to pass through the filtering material of the present invention. It should be noted that the number of bacteria included in each suspension prior to flowing through the filtering material of the present invention was $10^6$.

TABLE 2

| sample | the number of bacteria which had permeated through the filtering material | | |
|---|---|---|---|
| | Escherichia coli | Staphylococcus aureus | Pseudomonas aeruginosa |
| sheet-shaped paper | $10^5$ | $10^5$ | $10^5$ |
| unwoven cloth | $10^5$ | $10^5$ | $10^5$ |
| filtering material (sheet-shaped paper used as a sheet) | less than 10 (detection failed) | less than 10 | less than 10 |
| filtering material (unwoven cloth used as a sheet) | less than 10 | less than 10 | less than 10 |

As is apparent from Table 2, the filtering material of the present invention assures that any kind of bacteria can not permeate therethrough.

EXAMPLE 4

An example representing a deodoring capability of the filtering material of the present invention is shown in Table 3.

Specifically, Table 3 shows the results derived from evaluation on the deodoring capability of the filtering material which was practically evaluated in a stationary state. In practice, the deodoring capability of the filtering material was evaluated in a stationary state in such a manner that an odoring substance having an initial concentration (e.g., 50 ppm to 100 ppm) and a square filtering material of the present invention having dimensions 10 cm×10 cm were received in a tetrabag having a capacity of three liters and the present concentration of the odoring substance was measured by using a detection tube at each sampling time. Numerals representing the results derived from the measurements are shown in Table 3 by way of ppm in unit.

TABLE 3

| odoring substance | concentration measured at each measuring time (ppm) | | |
|---|---|---|---|
| | at a starting time | after one minute | after two minutes |
| ammonia | 100 | 3 | 0 |
| hydrogen sulfide | 100 | 5 | 0 |
| trimethylamine | 100 | 4 | 0 |
| methyl mercaputan | 100 | 20 | 8 |
| phenol | 50 | 5 | 0 |
| acetaldehyde | 50 | 10 | 2 |
| valeric acid | 50 | 20 | 7 |
| acetic acid | 50 | 8 | 0 |
| ethylene oxide | 50 | 4 | 0 |

EXAMPLE 5

Another example representing a deodoring capability of the filtering material of the present invention is shown in Table 4.

Similarly, Table 4 shows the results derived from evaluation on the deodoring capability of the filtering material which was practically evaluated by measuring air permeability and deodoring capability of the filtering material of the present invention. In practice, the air permeability and the deodoring capability of the filtering material were evaluated in such a manner that an air stream containing an odoring substance having an initial concentration (e.g., 50 ppm or 100 ppm) was caused to pass through the filtering material and a concentration of the odoring substance after completion of the passage of the air stream therethrough was then measured. Numerals on the table represent the deodoring capability of the filtering material by way of ppm in unit.

Specifically, a tetrabag having a capacity of three liters for supplying an air stream was connected to another tetrabag having a capacity of three liters for recovering the supplied air stream via an air venting tube, and a pump, a flow meter and a holder for the filtering material of the present invention were disposed along the air venting tube in accordance with an order as seen from the supply side. As the pump was driven, an air stream containing an odoring substance was forcibly caused to pass through the filtering material held by the holder and a concentration of the odoring substance remaining in the air stream in the tetrabag on the recovery side was then measured by using a detection tube. It should be noted that measurements were conducted under conditions that a flow rate of the air stream was set to one liter/minute and an air permeation surface area of the filtering material held by the holder was set to 15 cm². In addition, a differential pressure shown in Table 4 represents a difference between a pressure of the air stream before it reached the filtering material and a pressure of the same after it passed therethrough.

TABLE 4

| odoring substance | filtering material | concentration before air passage | concentration after air passage | differential pressure (at.) |
|---|---|---|---|---|
| ammonia | unwoven cloth | 100 | 60 | 6.0 |
| | filtering material of the present invention | 100 | 5 | 6.2 |
| trimethyl amine | unwoven cloth | 100 | 70 | 6.1 |
| | filtering material of the same | 100 | 2 | 6.1 |
| hydrogen sulfide | unwoven cloth | 100 | 60 | 6.0 |
| | filtering material of the same | 100 | 4 | 6.1 |
| ethylene oxide | unwoven cloth | 50 | 40 | 6.0 |
| | filtering material of the same | 50 | 2 | 6.1 |

Also in this embodiment, to improve connectability of fibers to two components, i.e., the porous apatite particles and the glucan, e.g., a polyvinyl alcohol having a small number of molecules may be added to the filtering material of the present invention as a third component. In addition, to improve microbicydal activity of the filtering material, atoms of matels such as zinc, copper, silver or the like each having excellent microbicydal activity may be substituted for calciulm atoms and also inserted into crystal lattices in the HAP.

While the present invention has been described above with respect to three embodiments and five examples thereof, it should of course be understood that the present invention should not be limited only to these embodiments but various changes and modifications may be made without departure from the scope of the present invention as defined by the appended claims.

What is claimed is:

1. Filtering material comprising;

porous apatite particles, a water soluble glucan, and a sheet-shaped raw material in which said porous apatite particles are contained aided by said water soluble glucan having a property of a binder.

2. A method of producing a filtering material, comprising;

a step of preparing an aqueous treatment solution in which porous apatite particles of 0.5 to 40% by weight and a water soluble glucan of 0.5 to 15% by weight are dispersively dissolved, a step of immersing a sheet-shaped raw material in said aqueous treatment solution to result in containing of said particles aided by said glucan having a property of a binder, and a subsequent step of drying said sheet-shaped material.

3. The method as claimed in claim 2, wherein said porous apatite particles are contained in said aqueous treatment solution in a quantity of 0.5 to 30% by weight.

4. A method of producing a filtering material, comprising;

a step of preparing an aqueous treatment solution in which porous apatite particles of 0.5 to 40% by weight and a water soluble glucan of 0.5 to 15% by weight are dispersively dissolved, a step of spraying said aqueous treatment solution to surfaces of a sheet-shaped raw material, and a step of drying said sheet-shaped raw material after said solution has been sprayed on said surfaces of said sheet-shaped raw material.

5. The method as claimed in claim 4, wherein said porous apatite particles are included in said aqueous treatment solution by a quantity of 0.5% to 30% in weight.

* * * * *